United States Patent
Kikuchi et al.

(10) Patent No.: US 8,319,621 B2
(45) Date of Patent: Nov. 27, 2012

(54) VEHICLE HAVING TIRE WEAR EVALUATION SYSTEM

(75) Inventors: Akira Kikuchi, Hitachi (JP); Motoo Futami, Hitachioota (JP); Toshikazu Minoshima, Kasumigaura (JP); Tomohiko Yasuda, Kashiwa (JP); Takayuki Sato, Kashiwa (JP); Kichio Nakajima, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 344 days.

(21) Appl. No.: 12/709,096

(22) Filed: Feb. 19, 2010

(65) Prior Publication Data
US 2010/0238007 A1    Sep. 23, 2010

(30) Foreign Application Priority Data
Mar. 19, 2009    (JP) .................................. 2009-067233

(51) Int. Cl.
*B60Q 1/00*    (2006.01)

(52) U.S. Cl. ........................... 340/438; 340/444; 73/146
(58) Field of Classification Search .................. 340/438, 340/441–444, 670; 324/160, 161; 73/178, 73/488, 146, 146.2, 146.3, 146.5; 702/145, 702/142; 701/93, 30, 29, 80
See application file for complete search history.

(56) References Cited

U.S. PATENT DOCUMENTS

| | | | | |
|---|---|---|---|---|
| 5,569,848 A * | 10/1996 | Sharp | | 73/146.2 |
| 5,591,906 A * | 1/1997 | Okawa et al. | | 73/146.5 |
| 6,076,035 A * | 6/2000 | Yanase | | 701/80 |
| 6,426,694 B1 * | 7/2002 | Larson | | 340/441 |
| 7,363,118 B2 * | 4/2008 | Jansson | | 701/1 |

FOREIGN PATENT DOCUMENTS

| | | |
|---|---|---|
| JP | 2002-221527 | 8/2002 |
| JP | 2003-172616 | 6/2003 |
| JP | 2006-162384 | 6/2006 |
| JP | 2007-259611 | 10/2007 |
| JP | 2008-011609 | 1/2008 |
| JP | 2008-187794 | 8/2008 |
| JP | 2009-241684 | 10/2009 |

* cited by examiner

*Primary Examiner* — Anh V La
(74) *Attorney, Agent, or Firm* — Antonelli, Terry, Stout & Kraus, LLP.

(57) ABSTRACT

A vehicle which evaluates tire wear properly even in a road condition that tires easily slip or lock up. The vehicle, which has a driven wheel and a driving wheel with tires attached thereto, includes: a revolution speed detector for detecting revolution speeds of the driven and driving wheels; a wheel speed detector for detecting wheel speeds of the driven and driving wheels based on the detected revolution speed data of the driven and driving wheels; a wheel speed ratio detector for detecting a wheel speed ratio between the driven and driving wheels based on the detected wheel speed data of the driven and driving wheels; and a tire condition evaluator for outputting an evaluation result indicating that the tire(s) attached to the driven wheel and/or driving wheel is(are) worn when the wheel speed ratio is higher than a preset threshold.

10 Claims, 10 Drawing Sheets

VEHICLE HAVING TIRE WEAR EVALUATION SYSTEM

BACKGROUND OF THE INVENTION

1. Field of the Invention

The present invention relates to a vehicle having driven and driving wheels to which tires are attached, and more particularly to a vehicle having a tire wear evaluation system which evaluates wear of tires using wheel speeds of driven and driving wheels.

2. Description of the Related Art

In open-pit mines or similar sites, such vehicles as dump trucks repeat a transportation cycle that they carry soil accumulated by a shovel to a given place and dump it there, and return to the original place in order to load soil again.

For higher efficiency in mine operation, there has been an increasing tendency toward larger dump trucks and very large load capacities. There are even large vehicles which weigh approximately 190 tons and have a load capacity of approximately 360 tons.

Such dump trucks are often used on a basis of three shifts per day and some of them are operated 20-24 hours a day, so their operation rates are very high. Therefore, their tires wear more quickly than the tires of ordinary passenger vehicles.

Generally, as tires wear, they are more likely to slip during acceleration and lock up during deceleration and it may become difficult to maintain the running stability of the vehicles. In addition, many mines have strict safety rules including a rule which prohibits dump trucks from being driven in a rainy weather in which tires easily slip or lock up.

Therefore, for the purpose of assuring running stability of dump trucks, it is very important to check the tires for wear.

With this background, JP-A No. 2006-162384 describes a method for detecting tire wear automatically. The method described there detects tire wear in which the outer circumference and outer diameter of a tire are calculated from the travel distance in a given period as determined from the position of the vehicle detected by GPS and the wheel revolution speed (number of revolutions) in that period and compared with the outer circumference and outer diameter of the same tire at an earlier time when it was not worn.

SUMMARY OF THE INVENTION

However, the above method does not take into consideration such road surface conditions that tires easily slip or lock up. In other words, in the method, when wear of the tire is checked tire slippage and lock-up are not considered.

For example, in a poor road surface condition, if a tire slips when the accelerator pedal is pressed, the revolution speed of the wheel is higher than when the tire does not slip, so it is decided that the travel distance per wheel revolution becomes shorter. In other words, it is decided that the outer circumference and outer diameter of the wheel are smaller than before.

On the other hand, in the poor road condition, if the tire locks up when the decelerator pedal is pressed, the revolution speed of the wheel is lower than when the tire does not lock up, so it is decided that the travel distance per wheel revolution becomes longer. In other words, it is decided that the outer circumference and outer diameter of the wheel is larger than before.

In either case, it is thought that in a road surface condition that the tire may slip or lock up, it may be impossible to detect properly whether the tire is worn or not.

As described above, in order to check tires for wear, it is very important to detect tire wear properly even in a situation that tires easily slip or lock up.

An object of the present invention is to provide a vehicle which evaluates tire wear properly even in a road surface condition that tires easily slip or lock up.

According to one aspect of the invention, a vehicle having driven and driving wheels to which tires are attached, such as a dump truck, has a tire wear evaluation system.

The vehicle described here has a revolution speed detector which detects revolution speeds of driven and driving wheels and outputs detected revolution speed data.

The tire wear evaluation system mounted in this vehicle includes: a wheel speed detector for detecting wheel speeds of the driven wheel and the driving wheel based on the detected revolution speed data of the driven wheel and the driving wheel and outputting the detected wheel speed data; a wheel speed ratio detector for detecting a wheel speed ratio between the detected wheel speed of the driven wheel and the detected wheel speed of the driving wheel based on the detected wheel speed data of the driven wheel and the driving wheel; and a tire condition evaluator for outputting an evaluation result indicating that the tire(s) attached to the driven wheel and/or the driving wheel is(are) worn, when a frequency of the wheel speed ratio exceeding a prescribed range is higher than a preset threshold.

The frequency is the number of times that the wheel speed ratio detector detects that the wheel speed ratio exceeds the prescribed range while the vehicle is running on a predetermined road.

The tire wear evaluation system mounted in the vehicle further includes a payload detector for detecting a payload and a wear detection count threshold calculator for outputting the threshold, wherein the wear detection count threshold calculator adjusts the threshold according to detected payload data outputted by the payload detector. The wear detection count threshold calculator makes an adjustment to make the threshold smaller when the detected payload data outputted by the payload detector is larger.

The tire wear evaluation system mounted in the vehicle further includes a road surface condition detector for detecting a surface condition of the road on which it is running and a wear detection count threshold calculator for outputting the threshold, wherein the wear detection count threshold calculator adjusts the threshold according to road surface condition information outputted by the road surface condition detector. The wear detection count threshold calculator makes an adjustment to make the threshold smaller when a road surface friction coefficient obtained from the road surface condition information outputted by the road surface condition detector is higher.

Preferably the vehicle includes a display to which the evaluation result is sent. Also, preferably the vehicle includes a transmitter which is used to send the evaluation result to a manager of the vehicle.

According to the present invention, the tire wear evaluation system mounted in the vehicle ensures that tire wear is evaluated properly even in a road surface condition that tires easily slip or lock up.

BRIEF DESCRIPTION OF THE DRAWINGS

Embodiments of the present invention will be described in detail based on the attached drawings, wherein.

DETAILED DESCRIPTION OF THE PREFERRED EMBODIMENTS

Next, a preferred embodiment of the present invention will be described referring to the accompanying drawings.

Figure 1:
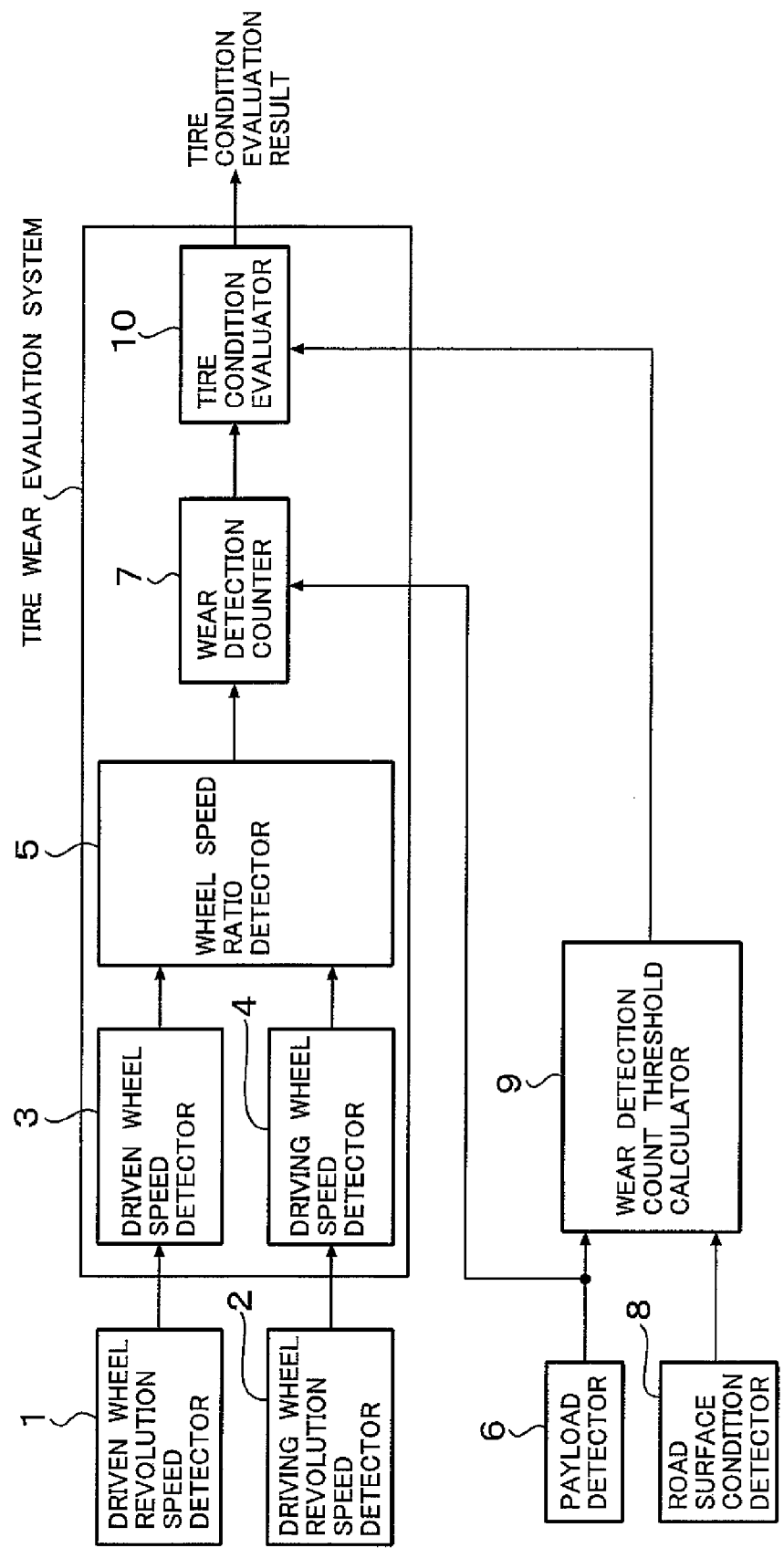
FIG. 1 shows the configuration of a tire wear evaluation system according to an embodiment of the invention.

FIG. 1 shows the configuration of a tire wear evaluation system.

A driven wheel revolution speed detector 1 detects the revolution speed of a driven wheel.

A driving wheel revolution speed detector 2 detects the revolution speed of a driving wheel.

Here, the revolution speed detector is a revolution speed sensor which detects the number of revolutions in a given time (for example, expressed in rad/s). The sensor may output a pulse signal and detect revolution speeds based on pulse interval differences.

A driven wheel speed detector 3 receives driven wheel revolution speed data (signal) from the driven wheel revolution speed detector 1 and calculates the wheel speed of the driven wheel using the preset tire radius of the driven wheel.

A driving wheel speed detector 4 receives driving wheel revolution speed data (signal) from the driving wheel revolution speed detector 2 and calculates the wheel speed of the driving wheel using the preset tire radius of the driving wheel.

Here, the wheel speed is a revolution speed multiplied by a tire radius (for example, expressed in m/s).

A wheel speed ratio detector 5 receives detected driven wheel speed data from the driven wheel speed detector 3 and detected driving wheel speed data from the driving wheel speed detector 4, calculates the wheel speed ratio between the driven wheel and driving wheel and outputs a wheel speed ratio signal.

A payload detector (for example, a payload sensor) 6 detects the payload of a dump truck and outputs detected payload data.

A wear detection counter 7 receives a wheel speed ratio signal from the wheel speed ratio detector 5 and detected payload data from the payload detector 6 and outputs a wear detection count.

More specifically, from the payload detected by the payload detector 6 the counter 7 gets information about whether the vehicle is loaded or unloaded or loading or dumping is started or ended, and based on the information, it knows when to start counting and when it is time to count, it counts the number of times that the wheel speed ratio signal sent from the wheel speed ratio detector 5 exceeds a prescribed range (for example, 0.9-1.1).

The prescribed range is determined, for example, by the relation between road surface friction coefficient and wheel slip ratio, taking tire characteristics (tire material and shape), etc. into account. Here it is assumed that the range is 1.0±10% or so.

A road surface condition detector 8 takes a photograph of a road surface on which the dump truck is running, by a camera, etc. and extracts and outputs a road surface friction coefficient and the like from road surface condition information (weather information such as whether it is rainy or fine and road information such as whether it is a gravel road or paved road).

A wear detection count threshold calculator 9 receives detected payload data (loading ratio) from the payload detector 6 and road surface condition information (road surface friction coefficient, etc) from the road surface condition detector 8 and outputs wear detection count threshold data, considering, as appropriate, the detected payload and road surface condition information and the vehicle's past travel data including travel distances and places where it traveled.

The wear detection count threshold must be a larger count value if the calculation cycle is short or the travel distance is long.

A tire condition evaluator 10 receives a wear detection count from the wear detection counter 7 and a wear detection count threshold from the wear detection count threshold calculator 9 and outputs the result of tire condition evaluation.

More specifically, the evaluator 10 compares the wear detection count (number of times of detection) from the wear detection counter 7 against the wear detection count threshold (number of times of detection) sent from the wear detection count threshold calculator 9 and if the wear detection count is larger than the wear detection count threshold, it outputs the result of tire condition evaluation indicating that the tire is worn.

It is preferable that the driven wheel speed detector 3, driving wheel speed detector 4, wheel speed ratio detector 5, wear detection counter 7, wear detection count threshold calculator 9, and tire condition evaluator 10 constitute a control block in a microcomputer.

Next, the configuration of the driven wheel speed detector 3 and that of the driving wheel speed detector 4 will be described.

Figure 2:
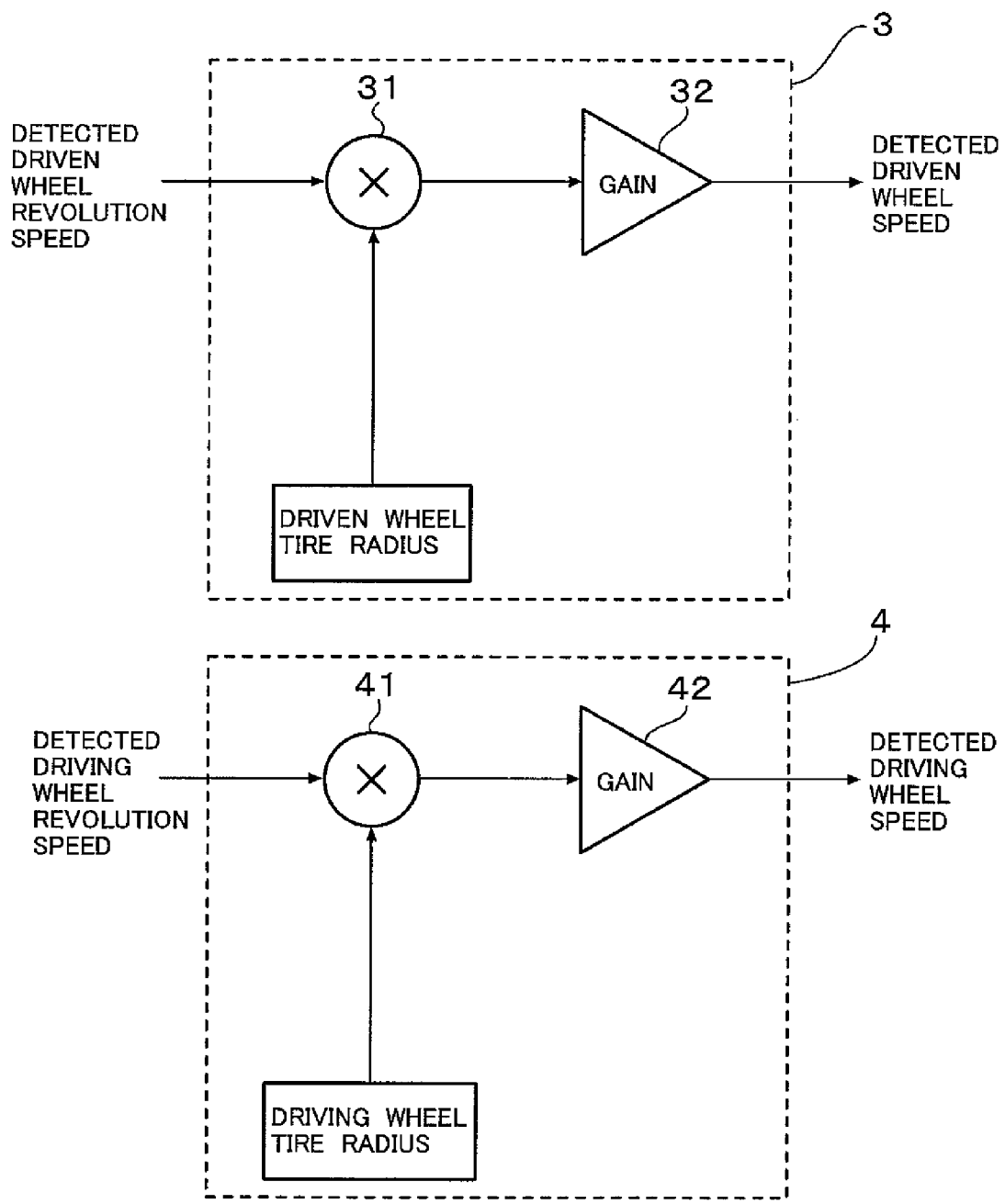
FIG. 2 shows the configuration of a driven wheel speed detector and that of a driving wheel speed detector.

FIG. 2 shows the configuration of the driven wheel speed detector 3 and that of the driving wheel speed detector 4.

A multiplier 31 receives detected driven wheel revolution speed data and the driven wheel tire radius and outputs the product of the detected driven wheel revolution speed and driven wheel tire radius. Then, by multiplying the output by gain 32, the driven wheel speed (detected value) is calculated. Here the driven wheel tire radius should be a preset tire radius (for example, initial tire radius at the time of attachment of a new tire).

Here, the gain 32 has an adjustment function to obtain a detected driven wheel speed from the detected driven wheel revolution speed.

A multiplier 41 receives detected driving wheel revolution speed data and the driving wheel tire radius and outputs the product of the detected driving wheel revolution speed and driving wheel tire radius. Then, by multiplying the output by gain 42, the driving wheel speed (detected value) is calculated. Here the driving wheel tire radius should be a preset tire radius (for example, initial tire radius at the time of attachment of a new tire).

Here, the gain 42 has an adjustment function to obtain a detected driving wheel speed from the detected driving wheel revolution speed.

Next, the configuration of the wheel speed ratio detector 5 will be described.

Figure 3:
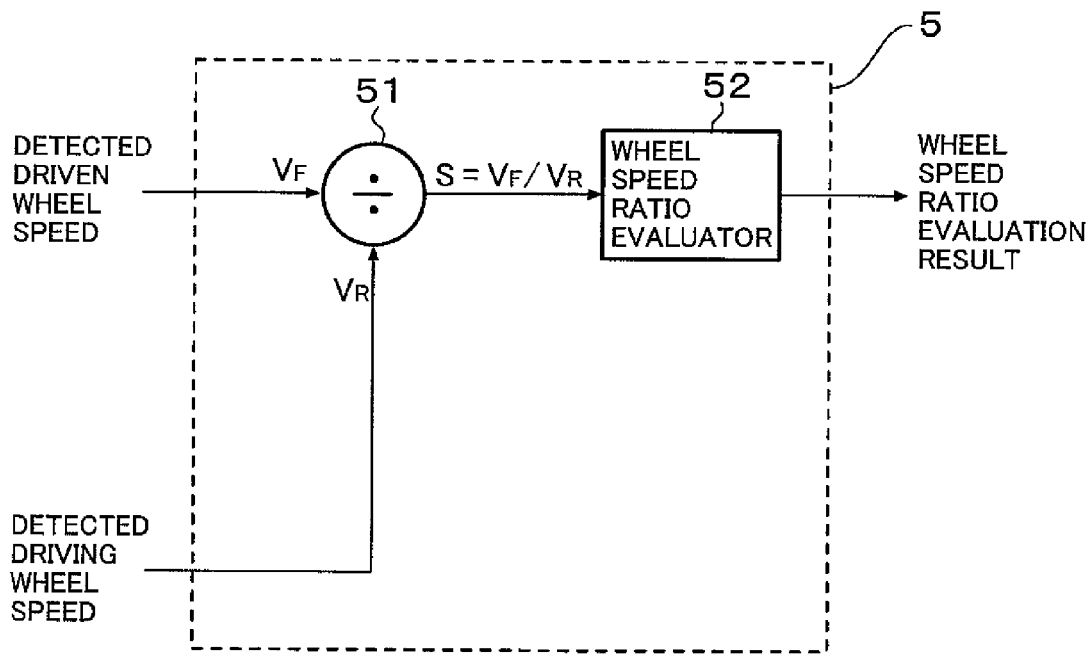
FIG. 3 shows the configuration of a wheel speed ratio detector.

FIG. 3 shows the configuration of the wheel speed ratio detector 5.

A divider 51 receives a detected driven wheel speed ($V_F$) and a detected driving wheel speed ($V_R$) and outputs a value S ($V_F/V_R$) obtained by dividing the detected driven wheel speed by the detected driving wheel speed.

The vehicle speed ratio evaluator 52 receives the S value from the divider 51 and outputs the result of evaluation of the wheel speed ratio.

Normally, since the detected driven wheel speed is almost equal to the detected driving wheel speed, the value S is around 1.

On the other hand, if the tire attached to the driving wheel is worn and its radius is smaller than the standard value, the revolution speed of the driving wheel increases in proportion to the decrease in the tire radius, which means that the detected driving wheel speed is larger than the true value. Therefore, the value S is smaller than 1.

Conversely, if the tire attached to the driven wheel is worn and its radius is smaller than the standard value, the revolution speed of the driven wheel increases in proportion to the decrease in the tire radius, which means that the detected driven wheel speed is larger than the true value. Therefore, the value S is larger than 1.

Therefore, which one of the tires attached to the driven and driving wheels is worn can be known from the value S and as the degree of wear is larger, S more deviates from 1, so it is possible to estimate the degree of wear.

Normally, since the tire attached to the driving wheel becomes more worn than the tire attached to the driven wheel, S is smaller than 1. For instance, if the tire attached to the driving wheel is worn and its radius decreases about 10%, S will be approximately 0.9. Therefore, if tires are permitted to become worn up to 10%, the wheel speed ratio evaluator 52 should decide whether S is smaller than 0.9 or not.

More specifically, if S is larger than 0.9, it decides that the tire attached to the driving wheel is not worn and if S is smaller than 0.9, it decides that the tire attached to the driving wheel is worn. Thus, ideally the wheel speed ratio evaluator 52 can detect tire wear by comparing S against a value determined according to the permissible degree of tire wear.

However, even if the tires attached to the driven and driving wheels are not worn, in a slippy road surface condition or similar road condition, the driving wheel can slip or lock up, and if that is the case, the system might decide that there is tire wear.

This occurs because a slip or lock-up of the driving wheel leads to a speed difference between the detected driven wheel speed and the detected driving wheel speed and consequently S becomes larger or smaller than 1. In that case, tire wear detection may be a false detection.

As apparent from the above, there are two cases of tire wear detection: in one case, the wheel speed ratio detector 5 detects tire wear when tires attached to the driven and driving wheels are actually worn and in the other case, it detects tire wear when the road surface is slippy and the driving wheel slips or locks up. In the latter case, a false detection may occur, so the influence of such detection should be eliminated, which will be discussed in detail later.

Next, the configuration of the wear detection counter 7 will be described.

Figure 4:
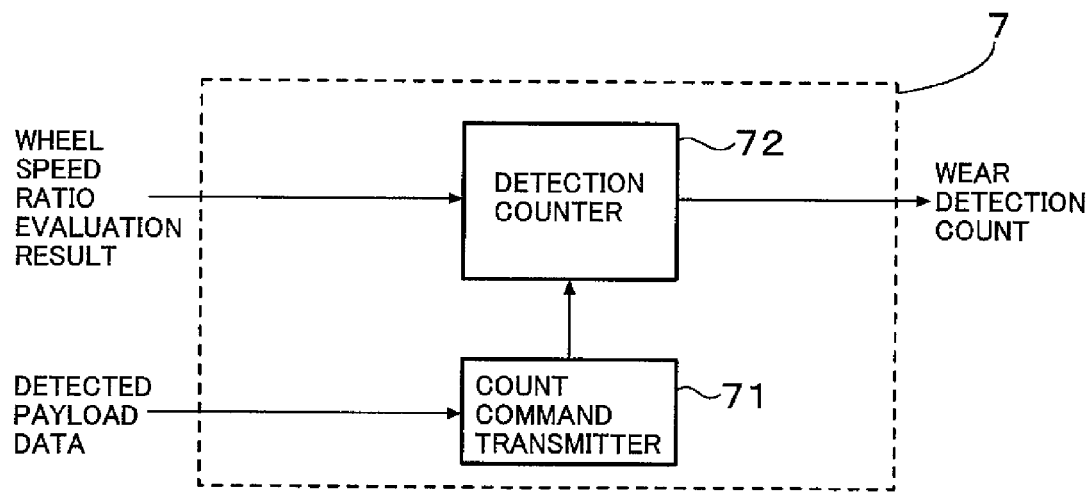
FIG. 4 shows the configuration of a wear detection counter.

FIG. 4 shows the configuration of the wear detection counter 7.

A count command transmitter 71 receives detected payload data and sends a detection counter 72 a command about whether or not to count.

The reason that the detected payload data is used here is to distinguish between counting with the dump truck loaded and counting with the truck unloaded.

When the count command transmitter 71 sends a command to start counting and the result of wheel speed ratio evaluation indicates wear of the tires attached to the driven and driving wheels (the wheel speed ratio exceeds the prescribed range), the detection counter 72 performs counting in a prescribed calculation cycle.

In other words, the count command transmitter 71 has a function to send the detection counter 72 a command to start or end counting or reset the count and the counter 72 counts the number of times of detection according to the command.

Figure 5:
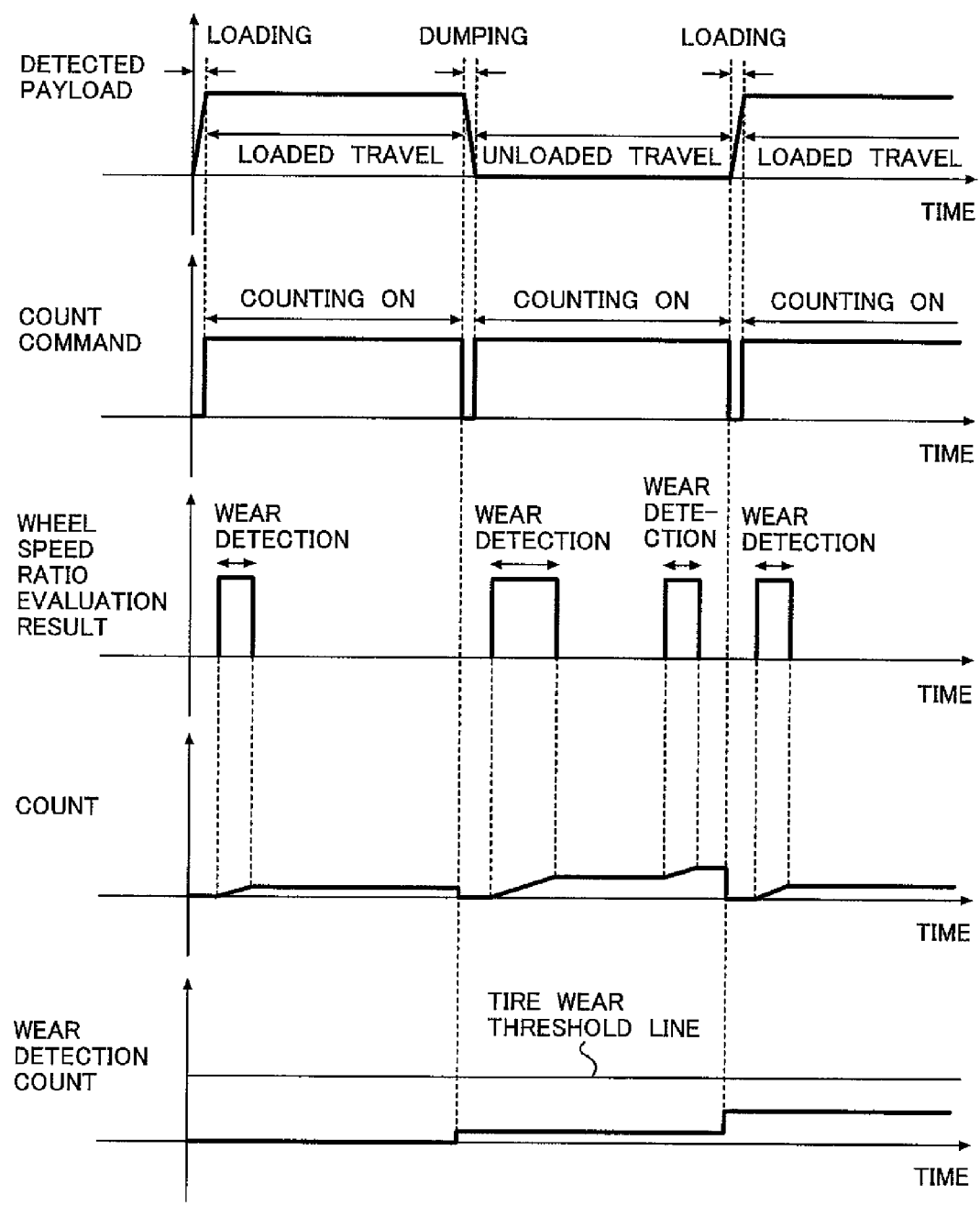
FIG. 5 is a chart showing operation of the wear detection counter.

FIG. 5 shows an example of operation of the wear detection counter 7.

First, when it is detected based on change in the detected payload data that loading soil onto the dump truck is completed, the count command transmitter 71 sends the detection counter 72 a command to start counting (counting ON). Then, when the result of vehicle speed ratio evaluation indicates wear of the tires attached to the driven and driving wheels (the wheel speed ratio exceeds the prescribed range), or upon wear detection, counting is performed in a prescribed calculation cycle.

Second, when it is detected based on change in the detected payload data that dumping of the soil loaded on the dump truck is started, the count command transmitter 71 stops the count command to the detection counter 72 and the detection counter 72 outputs the current count as a wear detection count and resets the count.

Third, when it is detected based on change in the detected payload data that dumping of the soil from the dump truck is completed, the count command transmitter 71 sends the detection counter 72 a command to start counting (counting ON). Then, when the result of vehicle speed ratio evaluation indicates wear of the tires attached to the driven and driving wheels (the wheel speed ratio exceeds the prescribed range), or upon wear detection, counting is performed in a prescribed calculation cycle.

Fourth, when it is detected based on change in the detected payload data that loading of soil onto the dump truck is started, the count command transmitter 71 stops the count command to the detection counter 72 and the detection counter 72 outputs the current count as a wear detection count and resets the count.

The above sequence makes it possible to count the number of times of wear detection with the dump truck loaded and that with the dump truck unloaded separately (wear is detected when the wheel speed ratio exceeds the prescribed range).

Regarding the result of wheel speed ratio evaluation for wear detection, the number of times that the wheel speed ratio exceeds the prescribed range is counted in a time, namely a prescribed calculation cycle.

The count value increases by the number of times of counting made in the prescribed calculation cycle.

The wear detection count value is a count value which is reset.

Then, a decision is made as to whether or not the wear detection count is beyond a tire wear threshold line and a final decision is made as to whether the tires are worn or not.

In this example, since the wear detection count is not beyond the tire wear threshold line, it is decided that the tires are not worn.

Alternatively, a signal other than the payload detection signal may be used to detect whether loading or dumping of soil is being carried out.

It is also possible that the detection counter 72 counts not the number of times of detection of wear of the tires attached to the driven and driving wheels but the time duration of tire wear detection, namely time duration of wear detection signal output.

Next, the configuration of the wear detection count threshold calculator 9 will be described.

Figure 6:
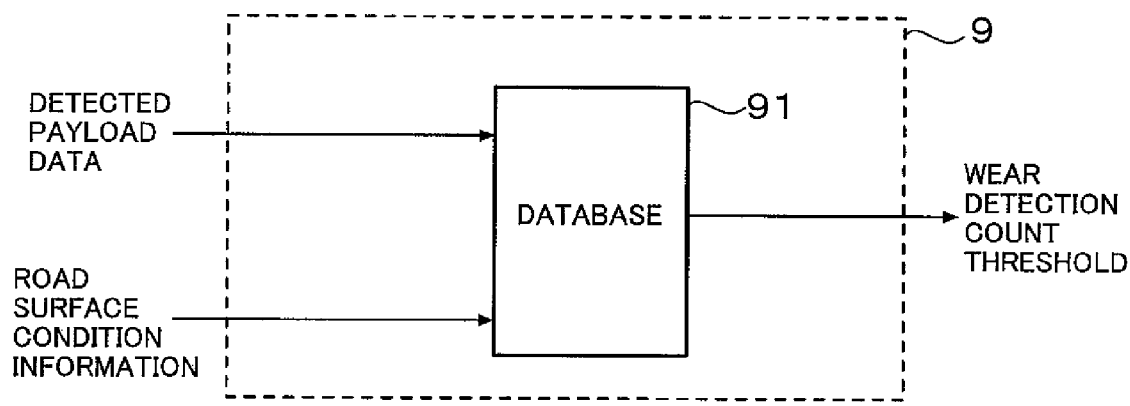
FIG. 6 shows the configuration of a wear detection count threshold calculator.

FIG. 6 shows the configuration of the wear detection count threshold calculator 9.

A database 91 receives detected payload data and road surface information and outputs a wear detection count threshold based on the past travel data.

Figure 7:
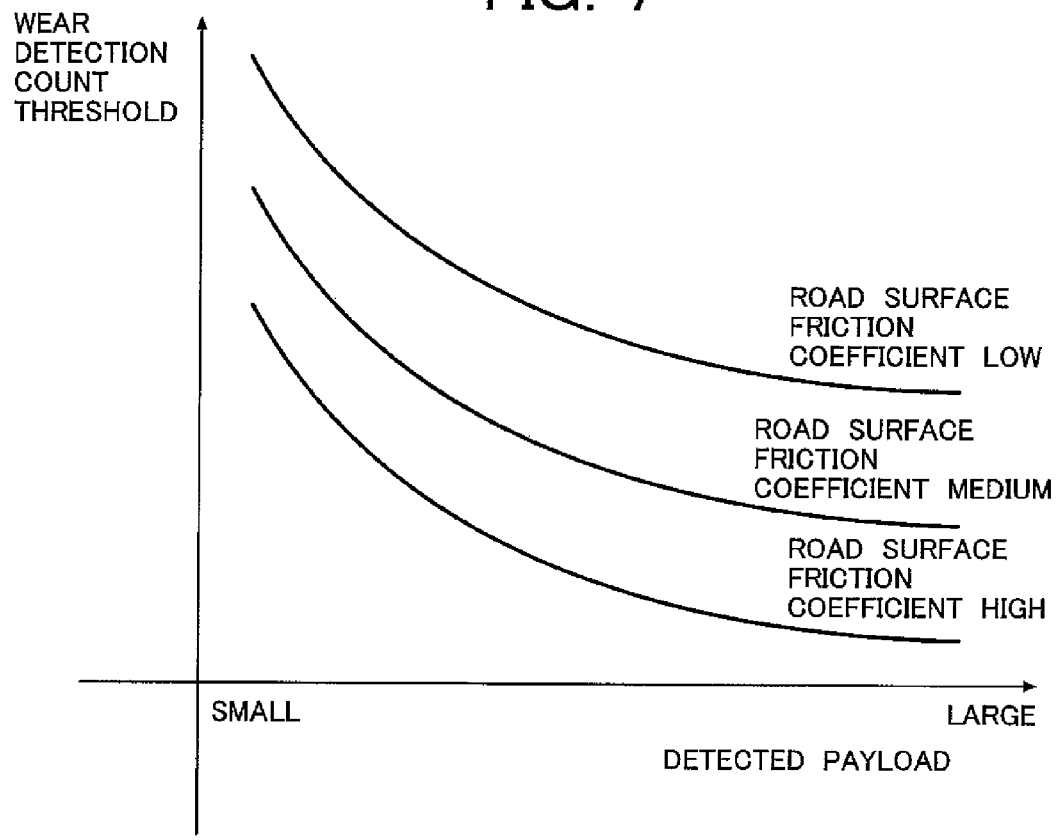
FIG. 7 shows database output characteristics.

FIG. 7 shows an example of output of wear detection count thresholds outputted by the database 91.

As shown in FIG. 7, when the detected payload is small or the road surface condition is poor with a low road surface friction coefficient, the wear detection count threshold value is large and conversely when the detected payload is large or the road surface condition is good with a high road surface friction coefficient, the wear detection count threshold value is small.

The reason that the wear detection count threshold is varied depending on the payload and road surface condition will be explained later.

Next, the configuration of the tire condition evaluator 10 will be described.

Figure 8:
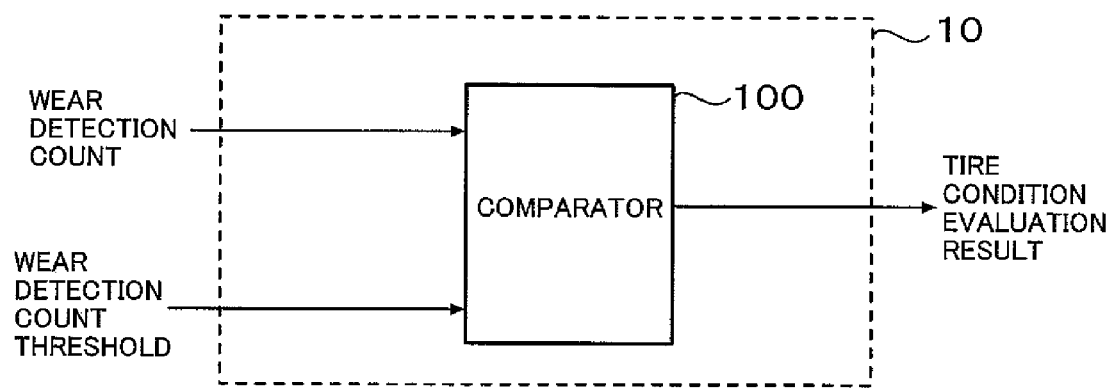
FIG. 8 shows the configuration of a tire condition evaluator.

FIG. 8 shows the configuration of the tire condition evaluator 10.

A comparator 100 receives wear detection count data and wear detection count threshold data and outputs the result of tire condition evaluation.

When the wear detection count is larger than the wear detection count threshold, the comparator 100 decides that the tires attached to the driven and driving wheels are worn and outputs the result of tire condition evaluation. When the tire condition evaluator 10 decides that the tires are worn, it gives the dump truck driver or the mine manager as the owner of the dump truck a visual or audio message to warn that the tires of the truck are worn or urge them to inspect or replace the tires.

The reason that comparison is made between the wear detection count and the wear detection count threshold is that it is necessary to eliminate the influence of false tire wear detection by the wheel speed ratio detector 5 which may occur when the driving wheel slips or locks up.

Specifically, even if the wheel speed ratio detector 5 detects tire wear falsely due to a slip or lock-up of the driving wheel and the wear detection count increases, the comparator 100 does not decide that the tires are worn if the wear detection count threshold is larger than it, so the use of the wear detection count threshold eliminates the influence of a slip or lock-up of the driving wheel.

Since the dump truck repeats a transportation cycle that it carries soil accumulated by a shovel to a given place and dumps it, and returns to the original place in order to load soil again, basically the travel route and travel pattern are almost constant and it is thus possible to determine an adequate value as a wear detection count threshold based on the past travel condition data.

Usually, when the payload is small or the road surface condition is poor with a low road surface friction coefficient, the wear detection count threshold value should be large because the driving wheel is more likely to slip or lock up.

On the other hand, when the payload is large or the road surface condition is good with a high road surface friction coefficient, the wear detection count threshold value should be small because the driving wheel is less likely to slip or lock up.

It is preferable that the time to evaluate the tire condition be time when the dump truck dumps or loads soil.

Whether dumping has been done is decided by comparison between the wear detection count threshold updated at the time of soil dumping after a loaded travel of the dump truck and the wear detection count threshold outputted by the wear detection count threshold calculator 9 during the loaded travel.

Whether loading has been done is decided by comparison between the wear detection count threshold updated at the time of soil loading after an unloaded travel of the dump truck and the wear detection count threshold outputted by the wear detection count threshold calculator 9 during the unloaded travel.

Tire condition evaluations are thus made separately for the case that the dump truck is loaded and the case that it is unloaded. This is because the ratio of incidence of tire slips and lock-ups largely differs depending on whether the dump truck is loaded or unloaded and the wear detection count threshold should be varied accordingly.

Figure 9:
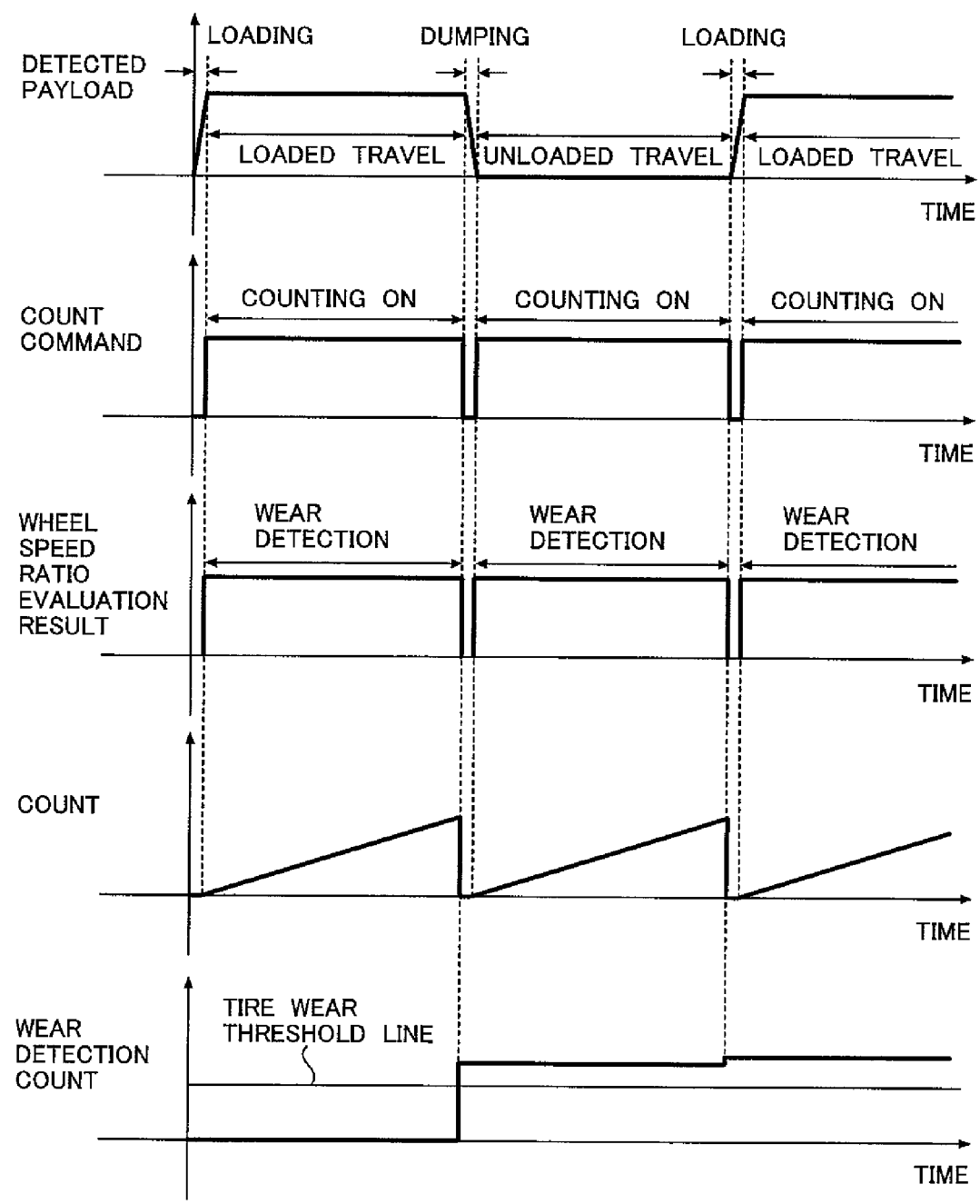
FIG. 9 is a chart showing operation of the wear detection counter when the tires are worn.

FIG. 9 shows an example of operation of the wear detection counter 7 when the tires attached to the driven and driving wheels are worn.

As shown in FIG. 9, when the tires are worn, tire wear is constantly detected during a travel (wear detection), namely it is detected that the result of wheel speed ratio evaluation exceeds the prescribed range and counting is performed in the prescribed calculation cycle and the count increases. As the wear detection count increases and goes beyond the tire wear threshold line, it is decided that the tires are worn.

Thus, the wear detection count goes beyond the wear detection count outputted by the wear detection count threshold calculator 9 (tire wear threshold line) and the tire condition evaluator 10 decides that the tires attached to the driven and driving wheels are worn.

Which one of the tires attached to the driven and driving wheels is worn can be determined from the value S calculated by the wheel speed ratio detector 5 as mentioned earlier and the degree of wear can also be estimated.

As can be understood from the above, wear of the tires can be evaluated properly even in a road surface condition that the tires attached to the driven and driving wheels easily slip or lock up.

Even when, though the tires are not worn, the road surface is slippy and the driving wheel slips or locks up leading to a false tire wear detection by the wheel speed ratio detector 5, the tire condition evaluator 10 does not decide that the tires are worn unless the wear detection count goes beyond the wear detection count threshold which is based on the past travel data.

On the other hand, when the tires are actually worn, the wheel speed ratio detector 5 detects tire wear during traveling, the wear detection count increases and goes beyond the tire wear count threshold and the tire condition evaluator 10 decides that the tires are worn.

Figure 10:
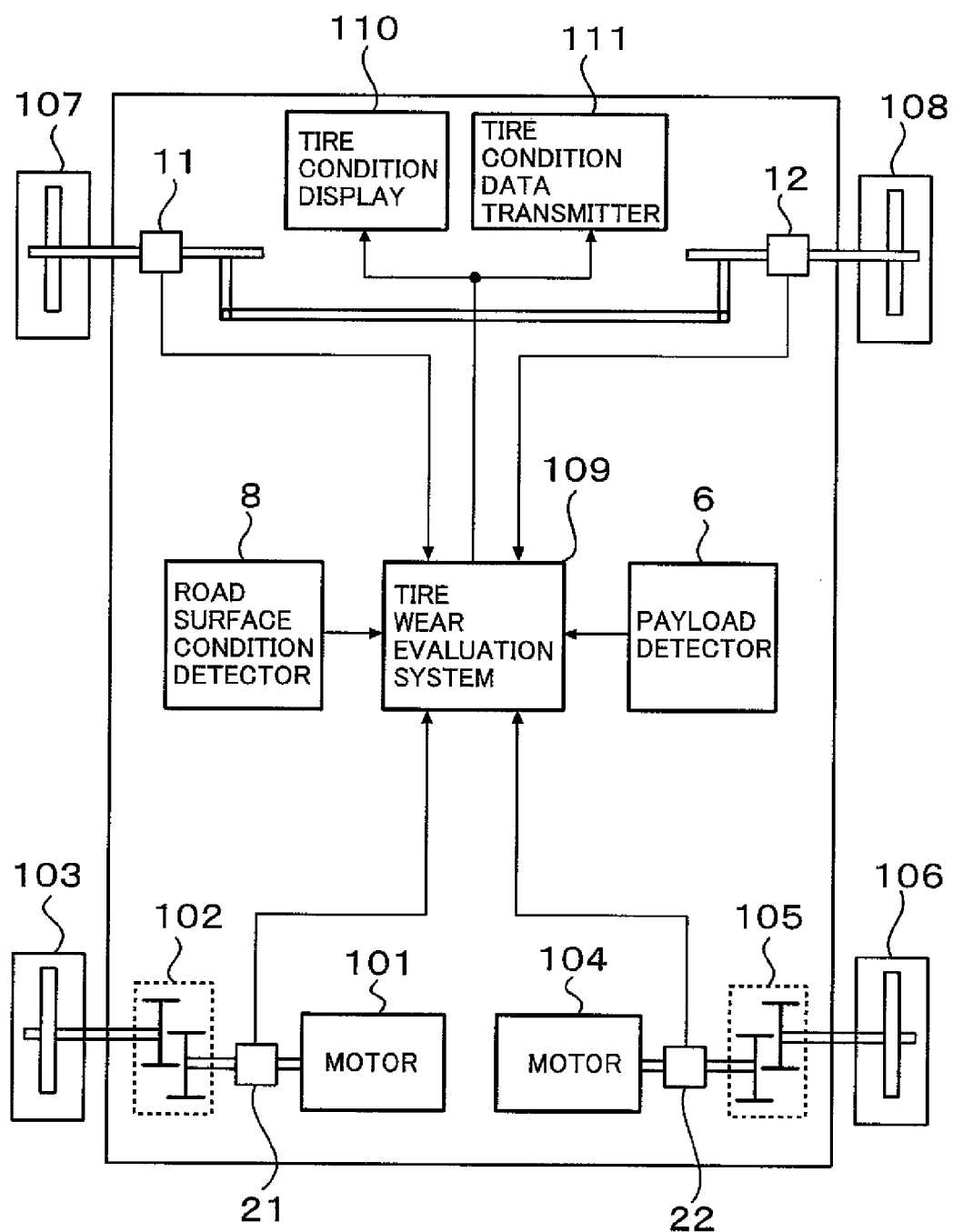
FIG. 10 shows a dump truck configuration according to the embodiment.

FIG. 10 shows an example of the tire wear evaluation system according to this embodiment which is mounted in a dump truck.

Referring to FIG. 10, a left motor 101 drives a left driving wheel 103 through gear 102 and a right motor 104 drives a right driving wheel 106 through gear 105 so that the dump truck moves forward and backward.

A left driving wheel revolution speed detector 21 is connected with the left motor 101 to detect the revolution speed of the left motor 101. A right driving wheel revolution speed detector 22 is connected with the right motor 104 to detect the revolution speed of the right motor 104.

A left driven wheel revolution speed detector 11 is connected with the shaft of a left driven wheel 107 to detect the revolution speed of the left driven wheel 107. A right driven wheel revolution speed detector 12 is connected with the shaft of a right driven wheel 108 to detect the revolution speed of the right driven wheel 108.

The tire wear evaluation system 109 receives detected payload data from the payload detector 6, road surface condition information from the road surface condition detector 8, detected left driven wheel revolution speed data from the left driven wheel revolution speed detector 11, detected right driven wheel revolution speed data from the right driven wheel revolution speed detector 12, detected left driving wheel revolution speed data from the left driving wheel revolution speed detector 21, and detected right driving wheel revolution speed data from the right driving wheel revolution speed detector 22 and sends the result of tire condition evaluation to a tire condition display 110 and a tire condition data transmitter 111.

The tire wear evaluation system 109 evaluates wear of the left tires of the dump truck using the detected left driven wheel revolution speed data and left driving wheel revolution speed data and evaluates wear of the right tires of the dump truck using the detected right driven wheel revolution speed data and right driving wheel revolution speed data.

Based on the result of tire condition evaluation outputted by the tire wear evaluation system 109, the tire condition display 110 gives the dump truck driver a visual or audio message to warn that the tires of the truck are worn or urge them to inspect or replace the tires.

The tire condition data transmitter 111 sends the result of tire condition evaluation outputted by the tire wear evaluation system 109 to the mine manager as the owner of the dump truck and the mine manager inspects or replaces the tires as needed based on the result of tire condition evaluation which he/she has received.

Figure 11:
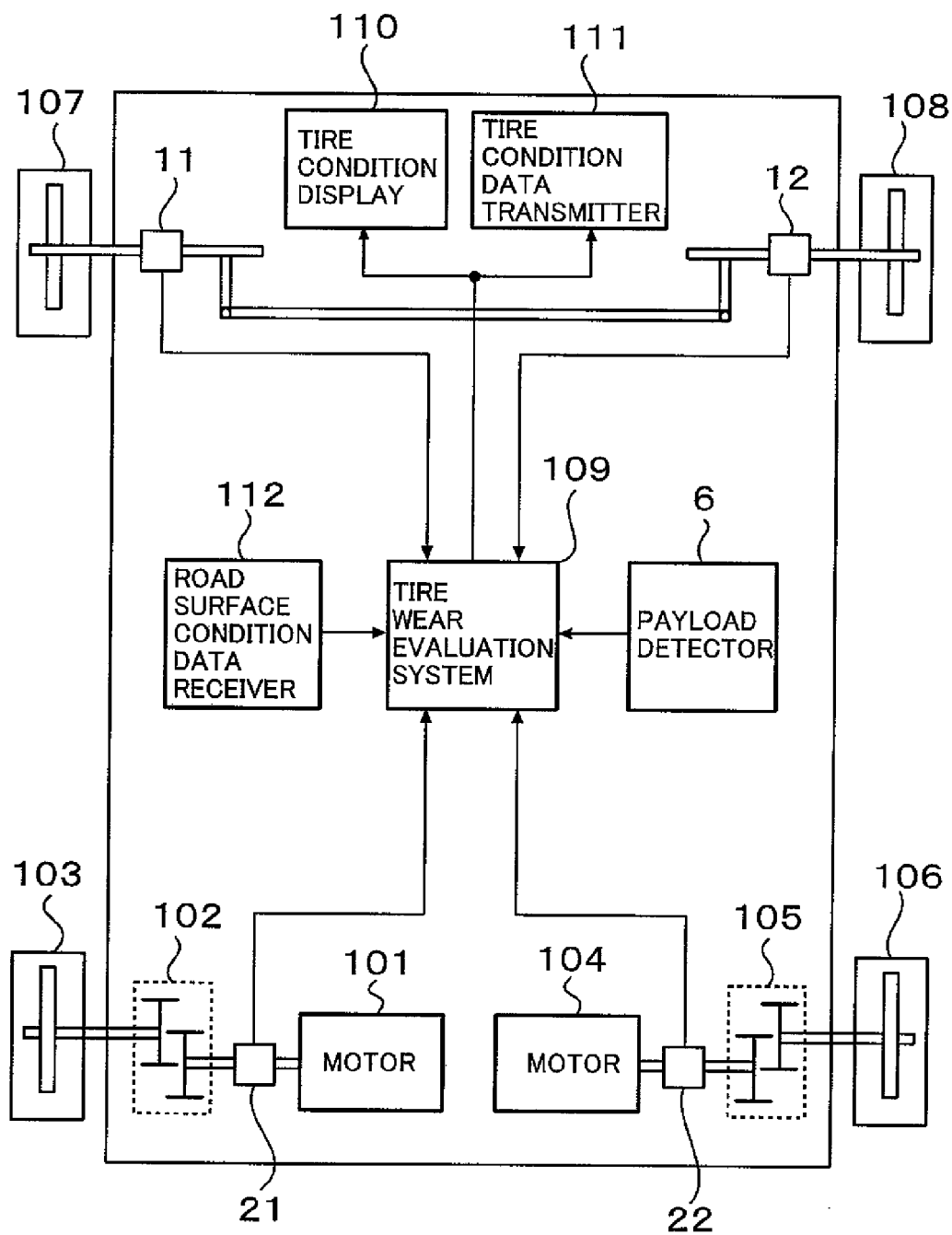
FIG. 11 shows another dump truck configuration according to the embodiment.

FIG. 11 shows another example of the tire wear evaluation system according to this embodiment which is mounted in a dump truck.

FIG. 11 is different from FIG. 10 in that a road surface condition data receiver 112 is provided instead of the road surface condition detector 8.

The road surface condition data receiver 112 receives external road surface condition information and sends it to the tire wear evaluation system 109. In other words, it is also possible that the dump truck does not detect the road surface condition but receives external road surface condition information.

Figure 12:
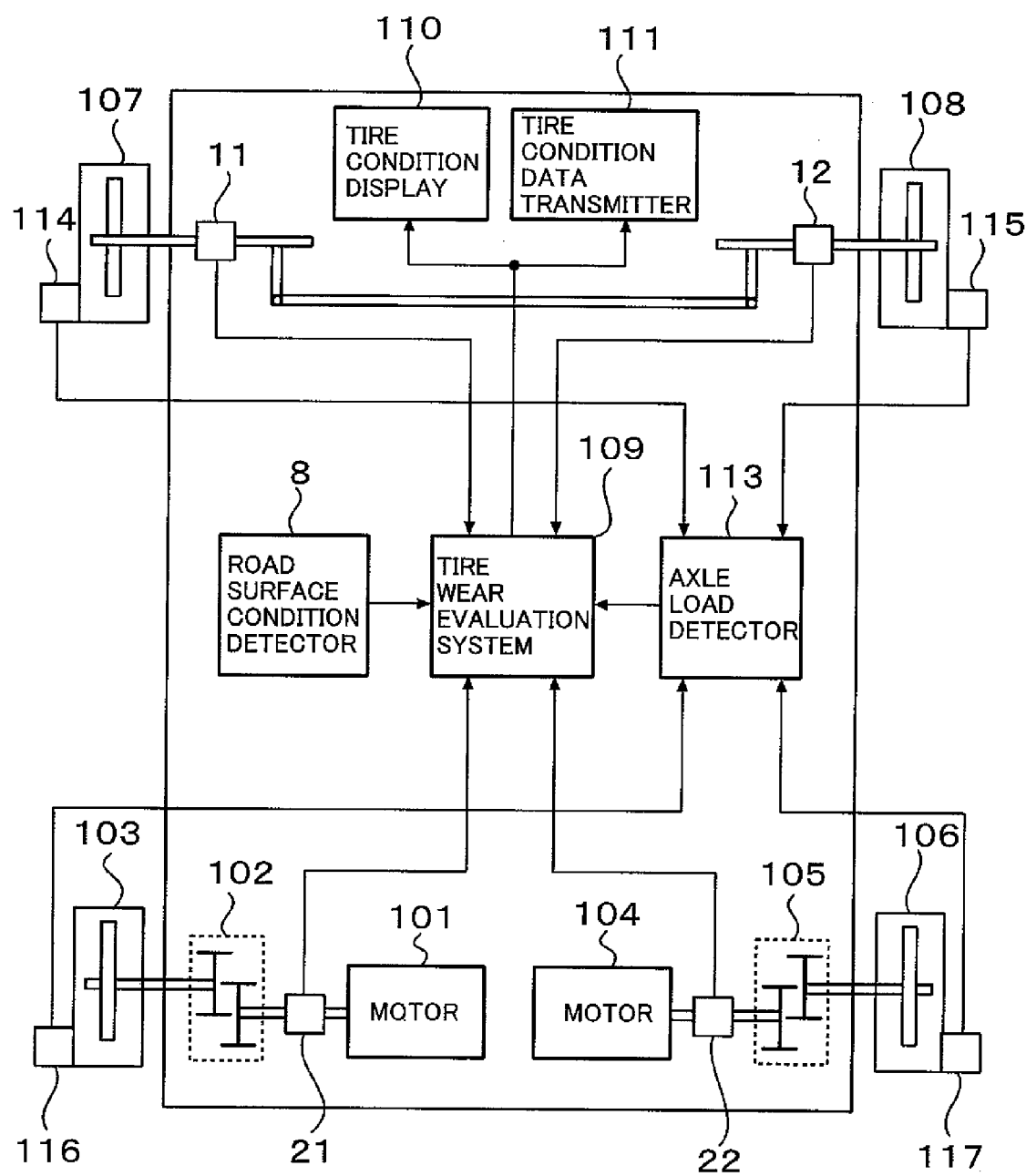
FIG. 12 shows a further dump truck configuration according to the embodiment.

FIG. 12 shows a further example of the tire wear evaluation system according to this embodiment which is mounted in a dump truck.

FIG. 12 is different from FIG. 10 in that an axle load detector 113 is provided instead of the payload detector 6 and a left driven wheel air pressure detector 114 is provided on the left driven wheel 107, a right driven wheel air pressure detector 115 is provided on the right driven wheel 108, a left driving wheel air pressure detector 116 is provided on the left driving wheel 103, and a right driving wheel air pressure detector 117 is provided on the right driving wheel 106.

The axle load detector 113 detects the load using air pressures of the four tires to calculate the payload.

The left driven wheel air pressure detector 114 detects the air pressure of the tire attached to the left driven wheel 107, the right driven wheel air pressure detector 115 detects the air pressure of the tire attached to the right driven wheel 108, the left driving wheel air pressure detector 116 detects the air pressure of the tire attached to the left driving wheel 103, and the right driving wheel air pressure detector 117 detects the air pressure of the tire attached to the right driving wheel 106.

The axle load detector 113 receives detected left driven wheel air pressure data from the left driven wheel air pressure detector 114, detected right driven wheel air pressure data from the right driven wheel air pressure detector 115, detected left driving wheel air pressure data from the left driving wheel air pressure detector 116, and detected right driving wheel air pressure data from the right driving wheel air pressure detector 117 and calculates the axle load of each wheel and outputs the calculated axle load data. This means that the calculated axle load data may be used instead of detected payload data.

According to this embodiment, it is possible to evaluate tire wear properly even in a road surface condition that the tires attached to the driven and driving wheels easily slip or lock up.

Proper evaluation of tire wear ensures stability in the travel of the dump truck and leads to improvement in the operation rate of the dump truck. In addition, since tire wear is automatically evaluated, maintainability is also improved.

Furthermore, although tires can be visually checked for wear by drivers, the system can compensate for differences in tire wear evaluation among individual drivers, which will greatly contribute to maintenance of tires.

Dump trucks for use in mines have a very large load capacity and the body weight difference between their loaded and unloaded states is much larger than in ordinary trucks and passenger vehicles and their maximum body weight in the fully loaded state is about twice or three times as much as their minimum body weight in the unloaded state.

Therefore, when the vehicle weight is light, the frictional force generated between the tires and road surface with a wheel driving or braking torque decreases and the tires become easier to slip or lock up.

For this reason, this embodiment is very useful for dump trucks for use in mines.

The present invention is applicable to vehicles having driven and driving wheels to which tires are attached and more particularly to dump trucks with a tire wear evaluation system which evaluates tire wear according to the wheel speeds of driven and driving wheels.

It should be understood by those skilled in the art that various modifications, combinations, sub-combinations and alterations may occur depending on design requirements and other factors insofar as they are within the scope of the appended claims or the equivalents thereof.

What is claimed is:

1. A vehicle having a driven wheel and a driving wheel to which tires are attached, comprising:
   a revolution speed detector for detecting revolution speeds of the driven wheel and the driving wheel and outputting detected revolution speed data;
   a wheel speed detector for detecting wheel speeds of the driven wheel and the driving wheel based on the detected revolution speed data of the driven wheel and the driving wheel and outputting the detected wheel speed data;

a wheel speed ratio detector for detecting a wheel speed ratio between the detected wheel speed of the driven wheel and the detected wheel speed of the driving wheel based on the detected wheel speed data of the driven wheel and the driving wheel;

a tire condition evaluator for outputting an evaluation result indicating that the tire attached to the driven wheel or the driving wheel is worn or the tires attached to the driven wheel and the driving wheel are worn, when a frequency of the wheel speed ratio exceeding a prescribed range is higher than a preset threshold;

a payload detector for detecting a payload; and a wear detection count threshold calculator for outputting the threshold;

wherein the wear detection count threshold calculator adjusts the threshold according to detected payload data outputted by the payload detector.

2. The vehicle according to claim 1, wherein the frequency is the number of times that the wheel speed ratio detector detects that the prescribed range is exceeded while the vehicle is running on a road.

3. The vehicle according to claim 1, wherein the wear detection count threshold calculator makes an adjustment to make the threshold smaller when the detected payload data outputted by the payload detector is larger.

4. The vehicle according to claim 1, further comprising a display, wherein the evaluation result is sent to the display.

5. The vehicle according to claim 1, further comprising a transmitter, wherein the transmitter is used to send the evaluation result to a manager of the vehicle.

6. A vehicle having a driven wheel and a driving wheel to which tires are attached, comprising:

a revolution speed detector for detecting revolution speeds of the driven wheel and the driving wheel and outputting detected revolution speed data;

a wheel speed detector for detecting wheel speeds of the driven wheel and the driving wheel based on the detected revolution speed data of the driven wheel and the driving wheel and outputting the detected wheel speed data;

a wheel speed ratio detector for detecting a wheel speed ratio between the detected wheel speed of the driven wheel and the detected wheel speed of the driving wheel based on the detected wheel speed data of the driven wheel and the driving wheel;

a tire condition evaluator for outputting an evaluation result indicating that the tire attached to the driven wheel or the driving wheel is worn or the tires attached to the driven wheel and the driving wheel are worn, when a frequency of the wheel speed ratio exceeding a prescribed range is higher than a preset threshold;

a road surface condition detector for detecting a surface condition of the road on which it is running; and a wear detection count threshold calculator for outputting the threshold;

wherein the wear detection count threshold calculator adjusts the threshold according to road surface condition information outputted by the road surface condition detector.

7. The vehicle according to claim 6, wherein the wear detection count threshold calculator makes an adjustment to make the threshold smaller when a road surface friction coefficient obtained from the road surface condition information outputted by the road surface condition detector is higher.

8. The vehicle according to claim 6, wherein the frequency is the number of times that the wheel speed ratio detector detects that the prescribed range is exceeded while the vehicle is running on a road.

9. The vehicle according to claim 6, further comprising a display, wherein the evaluation result is sent to the display.

10. The vehicle according to claim 6, further comprising a transmitter, wherein the transmitter is used to send the evaluation result to a manager of the vehicle.

\* \* \* \* \*